(12) United States Patent
Carbajal et al.

(10) Patent No.: US 7,825,072 B2
(45) Date of Patent: *Nov. 2, 2010

(54) INHIBITIVE WATER-BASED DRILLING FLUID SYSTEM AND METHOD FOR DRILLING SANDS AND OTHER WATER-SENSITIVE FORMATIONS

(75) Inventors: David L. Carbajal, Houston, TX (US); William Shumway, Spring, TX (US); Ryan G. Ezell, Spring, TX (US)

(73) Assignee: Halliburton Energy Services Inc., Duncan, OK (US)

( * ) Notice: Subject to any disclaimer, the term of this patent is extended or adjusted under 35 U.S.C. 154(b) by 147 days.

This patent is subject to a terminal disclaimer.

(21) Appl. No.: 12/284,272

(22) Filed: Sep. 19, 2008

(65) Prior Publication Data
US 2009/0036330 A1 Feb. 5, 2009

Related U.S. Application Data

(63) Continuation-in-part of application No. 10/831,668, filed on Apr. 24, 2004, now Pat. No. 7,439,210.

(51) Int. Cl.
C09K 8/24 (2006.01)
E21B 7/00 (2006.01)
(52) U.S. Cl. .................. 507/120; 175/57; 175/65; 175/66; 507/112; 507/139; 507/140; 507/141
(58) Field of Classification Search .............. 507/120, 507/112, 139, 140, 141; 175/57, 65, 66
See application file for complete search history.

(56) References Cited

U.S. PATENT DOCUMENTS

| 3,909,421 | A | 9/1975 | Gaddis |
|---|---|---|---|
| 4,128,528 | A | 12/1978 | Frisque et al. |
| 4,391,925 | A | 7/1983 | Mintz et al. |
| 4,442,241 | A | 4/1984 | Drake et al. |
| 4,475,594 | A | 10/1984 | Drake et al. |
| 4,503,170 | A | 3/1985 | Drake et al. |
| 5,028,341 | A | 7/1991 | Liao |
| 5,076,373 | A | 12/1991 | Hale et al. |
| 5,134,118 | A | 7/1992 | Patel et al. |
| 5,424,284 | A | 6/1995 | Patel et al. |
| 5,454,668 | A | 10/1995 | Liao |
| 5,609,438 | A | 3/1997 | Liao |
| 5,735,349 | A | 4/1998 | Dawson et al. |
| 5,789,349 | A | 8/1998 | Patel |
| 5,908,814 | A | 6/1999 | Patel et al. |
| 5,955,401 | A | 9/1999 | Liao |
| 6,025,304 | A | 2/2000 | Southwell et al. |
| 6,152,227 | A | 11/2000 | Lawson et al. |
| 6,156,819 | A | 12/2000 | Lai et al. |
| 6,355,600 | B1 | 3/2002 | Norfleet et al. |
| 6,596,670 | B1 | 7/2003 | Mueller et al. |
| 6,818,596 | B1 | 11/2004 | Hayes |
| 7,439,210 | B2 | 10/2008 | West et al. |
| 2002/0128158 | A1 | 9/2002 | Green |
| 2002/0147113 | A1 | 10/2002 | Green |
| 2002/0155956 | A1 | 10/2002 | Chamberlain et al. |
| 2002/0160919 | A1 | 10/2002 | Stowe, II et al. |
| 2003/0236171 | A1 | 12/2003 | Nguyen et al. |
| 2004/0063588 | A1 | 4/2004 | Rose et al. |

FOREIGN PATENT DOCUMENTS

| GB | 1 547 951 | 7/1979 |
|---|---|---|
| WO | WO 2005/061652 A1 | 7/2005 |
| WO | WO 2005/103194 A1 | 11/2005 |

OTHER PUBLICATIONS

Arvind Patel, et al., Designing for the Future—A Rev. of the Design, Development & Testing of a Novel, Inhibitive Water-Based Drilling Fluid, AADE-02-DFWM-HO-33 (2002), 11 pp.
Zaitoun, et al., Stabilization of Montmorillonite Clay in Porous Media by Polyacrylamides, SPE 31109, Feb. 12-15, 1996, Lafayette, LA, 6 pp.
Clay Grabber (trademark) Flocculant, Product Data Sheet, Baroid, Halliburton, Apr. 2005, 1 page.
GEM (trademark) GP Shale Stabilizer, Product Data Sheet, Baroid Fluid Services, Halliburton, Sep. 5, 2006, 2 pp.
GEM (trademark) CP Shale Stabilizer, Product Data Sheet, Baroid Fluid Services, Halliburton, Sep. 5, 2006, 2 pp.
Barazan (trademark) D PLUS Viscosifier/Susspension Agent, Product Data Sheet, Baroid Fluid Services, Halliburton, Sep. 5, 2006, 1 page.
Notification of Transmittal of the International Search Report and Written Opinion of Intern'l Searth Authority, Oct. 22, 2009, for PCT/GB2009/002165, related case, 3 pp.
PCT International Search Report for PCT/GB2009/002165, filed Sep. 10, 2009, related case, 3 pp.
Written Opinion of the International Authority for PCT/GB2009/002165, filed Sep. 10, 2009, related case, 9 pp.
European Patent Office Action for 08075842.8-2111/2028246, Sep. 22, 2009, related case, 8 pp.
European Patent Office Search Report for 08075842.8-2111, Jan. 21, 2009, related case, 7 pp.

*Primary Examiner*—Timothy J. Kugel
(74) *Attorney, Agent, or Firm*—Craig W. Roddy; Karen Tripp (57) ABSTRACT

An inhibitive water-based polymer mud system and method for using the system in drilling and in stabilizing wellbores is disclosed for use in water sensitive formations as an alternative to oil-based muds. The system comprises a substantially non-ionic low molecular weight polyacrylamide in combination with a substantially non-ionic high molecular weight polyacrylamide, preferably long chain alcohol or an amine or silicate shale inhibitor, and poly anionic cellulose.

24 Claims, 9 Drawing Sheets

INHIBITIVE WATER-BASED DRILLING FLUID SYSTEM AND METHOD FOR DRILLING SANDS AND OTHER WATER-SENSITIVE FORMATIONS

RELATED APPLICATION

This application is a continuation-in-part of U.S. patent application Ser. No. 10/831,668, filed Apr. 24, 2004, and issued Oct. 21. 2008, as U.S. Pat. No. 7,439,210.

BACKGROUND OF THE INVENTION

1. Field of the Invention

The present invention relates to drilling fluids and methods useful in drilling boreholes in water-sensitive formations. More particularly, this invention relates to water based drilling fluids and methods useful for stabilizing water sensitive shale formations in oil and gas drilling operations.

2. Description of Relevant Art

For many years the oil industry has searched for effective or highly inhibitive water-based drilling fluids that could be successfully substituted for oil-based drilling fluids for use in drilling water-sensitive formations such as swelling or sloughing shales, salt, gypsum, anhydrite or other evaporate formations, hydrogen sulfide-containing formations, and hot (greater than about 300 degrees Fahrenheit ("° F.")) holes. Although oil-based drilling fluids, most commonly invert emulsion fluids, have generally performed well as drilling fluids for such water-sensitive formations, water-based fluids are expected to be generally more economical and overall more readily compliant with environmental regulations. Moreover, in certain formations, water-based fluids are believed more suitable than oil-based fluids, even though such formations contain water-sensitive zones.

Shale hydration, however, commonly seen when ordinary water-based fluids are used in water-sensitive formations, is a significant cause of wellbore instability. Thus, any drilling fluid used in shales must exhibit minimal reactivity with the shales. That is, the water in the fluid should not cause swelling of the clays in the shales. Clays also tend to adhere to the drill bit or to the bottomhole assembly, severely impairing the rate of penetration during drilling. In some worst case scenarios, failure to remove hydratable clay from the wellbore can lead to gumbo attacks, packing off, lost circulation and stuck pipe.

Various water-based systems have been tried with varying amounts of success. Potassium/PHPA (polymer) fluids are one example, but these generally cannot reach the inhibition levels of oil-based fluids in water-sensitive clays. Cationic polymer fluids are another example, but these tend to be incompatible with anionic drilling fluid additives and may sometimes have toxicity problems.

High molecular weight polyacrylamide polymers are commercially available and well known for their ability to impart borehole stability by inhibiting shale hydration. An example is CLAY GRABBER® product, a high molecular weight polyacrylamide material available from Halliburton Energy Services, Inc. in Houston, Tex. While helpful, high molecular weight polyacrylamide polymers still do not provide the wellbore and shale stability advantages of an oil based drilling fluid and cannot impart to a water based drilling fluid the lubricity and resistance to contaminants that an oil based drilling fluid typically has. Additionally, high molecular weight polyacrylamide polymers cannot impart to a water based drilling fluid the ability to achieve the fast penetration drilling rate in the formation that can be obtained with an oil based drilling fluid. There is still a desire for a water-based drilling fluid with improved performance in water-sensitive formations or zones that can approximate the performance advantages of an oil based drilling fluid.

SUMMARY OF THE INVENTION

The present invention is based on the discovery of certain aqueous-based drilling fluids with enhanced shale stabilizing properties. Substantially non-ionic high and low molecular weight polyacrylamides provide the backbone of the fluids. These polyacrylamides may be homopolymers, copolymers, terpolymers, or a combination thereof, having a purity of at least about 95% acrylamido monomer species. The high molecular weight polyacrylamide has a molecular weight range of about 4 million to about 15 million and the low molecular weight polyacrylamide has a molecular weight range of about 500,000 to about 2 million. The substantially non-ionic character of the polyacrylamides, as the term "substantially non-ionic" is used herein, means that the polyacrylamides are at least about 95% non-ionic and thus have an overall generally non-ionic character, even though less than about 5% of the polyacrylamides used may have some charge or be ionic in character. The term "substantially non-ionic" as used herein is not meant to exclude, and rather is intended to include, polyacrylamides that are entirely or 100% non-ionic. These fluids of the present invention further preferably comprise a shale inhibitor which is a long chain alcohol(s), polyol(s), amine inhibitor, a Jeffamine, or sodium or potassium silicate. The fluids of the present invention may also comprise poly anionic cellulose. The combination of substantially non-ionic high and low molecular weight polyacrylamides in water-based drilling fluids provides a synergism that is most preferred to retard shale hydration while also providing superior drilling performance. The synergistic effect of this combination may be further enhanced with the alcohol (or alternatively, although less preferred, amine inhibitor or silicate) and/or poly anionic cellulose.

In one preferred embodiment, the present invention provides a method for drilling or stabilizing a downhole water-sensitive formation. The method comprises providing and/or using a drilling fluid comprising a non-ionic low molecular weight polyacrylamide, a non-ionic high molecular weight polyacrylamide, one or more long chain alcohols or polyols, and poly anionic cellulose in an aqueous base. In another preferred embodiment, the present invention provides a drilling fluid suitable for drilling water-sensitive formations and for stabilizing boreholes penetrating water-sensitive formations. The fluid is also useful in effecting or enhancing flocculation in aqueous drilling fluids, aiding in the removal of drill cuttings from the drilling fluids. The fluid comprises a substantially non-ionic low molecular weight polyacrylamide, a substantially non-ionic high molecular weight polyacrylamide, long chain alcohol(s) or polyol(s), and poly anionic cellulose, in an aqueous base.

DETAILED DESCRIPTION OF PREFERRED EMBODIMENTS

In methods of the present invention, drilling of young shales and young, deep-water (offshore) hydratable formations may be conducted with an aqueous-based drilling fluid which inhibits gumbo attacks while affording more aggressive penetration rates than generally available with oil-based muds. Further, in methods of the invention, wellbore stability may be obtained, or a wellbore may be stabilized, using an aqueous-based drilling fluid even though the wellbore penetrates smectites, illites, and mixed layer clays.

The drilling fluid of the invention is an aqueous or water-based drilling fluid comprising substantially non-ionic low molecular weight polyacrylamide, such as, for example, CLAY SYNC™ product available from Halliburton Energy Services, Inc. in Houston, Tex., and substantially non-ionic high molecular weight polyacrylamide, such as, for example, CLAY GRABBER® product available from Halliburton Energy Services, Inc. in Houston, Tex. These polyacrylamides of this dual molecular weight system may be homopolymers, copolymers, terpolymers, or a combination thereof, and need not be "pure," or 100%, polyacrylamides, provided that they are substantially, that is, at least 95% derived from acrylamido monomer species. These polyacrylamides are not defined as industry accepted partially hydrolyzed polyacrylamides, or PHPA, commonly used in the prior art, which are ionic or have ionic character.

The members of the polyacrylamide family most commonly used in the oil and gas industry (for fluid loss control and/or for shale inhibition) is PHPA, which generally comprises at least about 30 weight percent acrylic acid, and which under drilling conditions is an anionic polyelectrolyte. In contrast, however, in the present invention, non-hydrolyzed polyacrylamides, or substantially, i.e., at least 95%, non-hydrolyzed polyacrylamides, are used due to their essentially non-ionic nature which is desired. The exact structures of the low molecular weight and high molecular weight non-ionic polyacrylamides are not believed critical, but these polyacrylamides should be substantially non-ionic. The substantially non-ionic character of the polyacrylamides, as the term "substantially non-ionic" is used herein, means that the polyacrylamides are at least about 95% non-ionic and thus have an overall generally non-ionic character, even though less than about 5% of the polyacrylamides used may have some charge or be ionic in character. The term "substantially non-ionic" as used herein is not meant to exclude, and rather is intended to include, polyacrylamides that are entirely or 100% non-ionic. That is, the high and low molecular weight hompolymer polyacrylamides comprising the fluids of the present invention are most preferably 100% non-ionic.

The drilling fluid of the invention further comprises most preferably both long chain alcohol(s) (or polyol(s)), such as the GEM™ products available from Halliburton Energy Services, Inc. in Houston, Tex. and Duncan, Okla., and poly anionic cellulose, although one or neither could alternatively less preferably be used. Also less preferably, an amine-based shale inhibitor, such as for example CLAYSEAL® additive, available from Halliburton Energy Services, Inc. in Houston, Tex. and Duncan, Okla., or a silicate, or an additive containing a glycol and a silicate, such as for example, BORE-HIB® additive, available from Halliburton Energy Services, Inc. in Houston, Tex. and Duncan, Okla., could be substituted for the alcohol or polyol or used optionally with such alcohol or polyol.

The long chain alcohol (or polyol) preferably is a polyethoxylated or polypropoxylated alcohol having a molecular weight in the range of about 100 to about 900 and most preferably having an average molecular weight of about 400. The long chain alcohol or polyol used in the present invention may have as few as a single hydroxyl group or may have as many hydroxyl groups as 200 to 260 per gram. One particularly preferred alcohol for use in the invention is GEM™ CP polyalkylene glycol, available from Halliburton Energy Services, Inc., in Houston, Tex. and Duncan, Okla. GEM™ CP alcohol more specifically is a non-ionic polyalkoxylated alcohol blend ranging from about $C_6$ to $C_{40}$ with a molecular weight range between 75 and 1000 g/mol. Another particularly preferred alcohol for use in the invention is GEM™ GP polyalkylene glycol or polyalkylene glycol blend. GEM™ GP alcohol more specifically is a polyalkylene glycol blend ranging from about $C_5$ to $C_{25}$ with a molecular weight range between 75 and 700 g/mol and a hydroxyl value from about 150 to 300 mg KOH/g. As used herein, reference to the term "long chain alcohol" (or "a long chain alcohol" or "long chain alcohol(s)") shall be understood to include one or more long chain alcohols, as a combination of long chain alcohols may be as effective as a single long chain alcohol. The poly anionic cellulose may be any or a combination of the several poly anionic celluloses readily available in the industry. Examples include without limitation PAC™ R product, PAC™ L product, and PAC™ RE product, PAC™ LE product, all available from Halliburton Energy Services, Inc. in Houston, Tex. and Duncan, Okla., and CELLEX™ products available from CP Kelco in Atlanta, Ga.

For preparation of the fluid of the invention, the high molecular weight polyacrylamide is preferably in liquid or emulsion form and the low molecular weight polyacrylamide is preferably in powder form and most preferably these polyacrylamides will always be in these preferred forms when used without addition of the long chain alcohol and/or the poly anionic cellulose. Other forms of the polyacrylamides, such as both the high and the low molecular weight polyacrylamides in liquid or emulsion form, or both the high and the low molecular weight polyacrylamides in powder form or the high molecular weight polyacrylamide in powder form and the low molecular weight polyacrylamide in liquid form, can also be used.

Over time during use, i.e., during drilling, the high molecular weight polyacrylamide will shear or degrade to a lower molecular weight polyacrylamide, but generally some ratio of low molecular weight polyacrylamide per barrel of drilling fluid to high molecular weight polyacrylamide per barrel of drilling fluid is required. In other words, the low-molecular weight nonionic polyacrylamide and the high-molecular weight nonionic polyacrylamide are both present in the drilling fluid. The low-molecular weight nonionic polyacrylamide and the high-molecular weight nonionic polyacrylamide are present in the drilling fluid in a ratio of about 16:6 to about 1:1, and more preferably in a ratio of about 10:1, on the basis of weight of active polymer material. About 4 to about 8 pounds (most preferably about 6 pounds) or about 2 to about 4% vol. of long chain alcohol (or polyol), and about 1 to about 2 pounds of poly anionic cellulose is preferably used per barrel of drilling fluid. In other words, the drilling fluid of the invention preferably comprises about 1-2 weight percent long chain alcohol (or polyol) and poly anionic cellulose, about 1-2 weight percent low molecular weight non-ionic polyacrylamide, and about 0.5 weight percent high molecular weight non-ionic polyacrylamide. Most preferably, the drilling fluid will not contain any polyacrylamides other than the high and low molecular weight polyacrylamides of the invention.

The low-molecular weight non-ionic polyacrylamide(s) preferably has a molecular weight in the range of about 500,000 to about 2 million. The high molecular weight non-ionic polyacrylamide(s) preferably has a molecular weight of about 4 million to about 8 million, although a weight as high as about 10 to about 15 million might alternatively be used. The exact preferred sizes of the polyacrylamides and long chain alcohol (or polyol) and poly anionic cellulose components of the drilling fluid of the invention may be modified with the varying pore size encountered in the formation such that the fluid is even more effective at "blocking off" the pores during drilling for preventing ion transport and resulting hydration of the shales or other water-sensitive zones of the formation. Such "blocking off" of the pores during drilling avoids swelling of such water-sensitive zones and thus avoids any substantial effect on or reduction in the permeability of the formation with respect to ultimate production from the formation. Thus, the fluid of the present invention, as a drilling fluid, forms a water blocking barrier preventing hydration of water-sensitive formations such as shales during drilling; it is not effective as, and should not be mistaken with, or characterized as, a lost circulation fluid, a fluid loss additive, or as a fracturing fluid, however. An advantage of the fluid of the invention is that a high rate of return permeability of the formation is seen when the fluid is used in drilling. Return permeability rates of about 86% or higher are typical with the fluid of the invention.

The drilling fluid of the present invention advantageously aids in drill solids flocculation and removal from the mud system. The drilling fluid prevents the cuttings from the formation, even highly reactive clays, from adhering together, so the cuttings are easily removed from the system in pieces ranging from baseball-size to smaller. Ultra fine and colloidal, low-gravity drilled solids are flocculated and encapsulated for efficient removal. MBTs (results of API methylene blue test for amount of clay or clay-like material in a drilling mud) stay below 10 pounds per barrel (ppb), even while drilling gumbo clays. In contrast, a typical prior art partially hydrolyzed polyacrylamide (PHPA) polymer aqueous based drilling fluid has MBTs of about 25 ppb to 30 ppb in gumbo clays. Also, with the drilling fluid of the present invention, bit and bottom hole tool (BHT) balling are substantially and significantly reduced from that commonly seen with aqueous based fluids used in drilling in highly reactive clay formations, resulting in minimal clay build-up on the bit and bottom hole tools and significantly more efficient and faster drilling.

The drilling fluid of the present invention most preferably will not contain any bentonite or other organophilic or synthetic clay based additives or lignite additives commonly used in prior art drilling fluids. The drilling fluid of the present invention may optionally contain organic or inorganic monovalent salts, such as, for example without limitation, sodium chloride or potassium chloride.

A typical formulation or composition of a drilling fluid system of the present invention is set forth in Table I below.

TABLE I

Aqueous base (preferably comprising about 6%-24% sodium chloride, potassium chloride, or other monovalent organic or inorganic salts) for hydrate suppression, (less or no salts may be used if hydrate suppression is not needed)
High molecular weight substantially non-ionic polyacrylamide (a primary polymeric encapsulator) (for example, CLAY GRABBER ® product, available from Halliburton Energy Services, Inc. in Houston, Texas) for smectite inhibition, flocculation of fine and mobile clays, and synergistic action with low molecular weight non-ionic polyacrylamide, long chain alcohol, and poly anionic cellulose to inhibit mixed layer clay hydration
Low molecular weight substantially non-ionic polyacrylamide (a primary polymeric inhibitor)(for example, CLAY SYNC ™ product, available from Halliburton Energy Services, Inc. in Houston, Texas) for illite inhibition and synergistic action with high molecular weight non-ionic polyacrylamide, long chain alcohol, and poly anionic cellulose to inhibit mixed layer clay hydration
Long Chain Alcohol (or Polyol) for synergistic action with high and low molecular weight non-ionic polyacrylamides to inhibit mixed layer clay hydration
Poly Anionic Cellulose for synergistic action with high and low molecular weight non-ionic polyacrylamides to inhibit mixed layer clay hydration
Viscosifier (for example, xanthan gum) to build gel strength and increase viscosity
Modified starch (for example, FILTER CHEK ™ product, available from Halliburton Energy Services, Inc. in Houston, Texas) for filtration control
Alkalinity control agent, such as potassium hydroxide, for alkalinity control (preferably keeping the fluid in the pH range of about 8.5 to about 10.0)
Density control agent, such as barium sulfate (for example, BARITE ™ product, available from Halliburton Energy Services, Inc. in Houston, Texas) for density control Other additives may be used or some of the additives in Table I may be omitted as appropriate for the particular application or subterranean formation, provided that the fluid comprises at least high molecular weight substantially non-ionic polyacrylamide and low molecular weight substantially non-ionic polyacrylamide, and preferably also long chain alcohol (or polyol) and preferably also poly anionic cellulose, all in an aqueous base. The aqueous base is preferably comprised of salt water, sea water, or brine, although fresh water may also be used.

When hydrate suppression is needed during drilling, formulating the aqueous drilling fluid of the invention with salts, such as for example sodium chloride, in addition to alcohols, most preferably long chain alcohols, along with the high and low molecular weight polyacrylamides is especially advantageous.

Laboratory and field tests were conducted with example fluids of the invention, some having the example composition set forth in Table II below.

TABLE II

Example Formulation

| | |
|---|---|
| Sodium Chloride | 24% |
| CLAY GRABBER ™ product (high molecular weight non-ionic polyacrylamide) | 0.5 ppb |
| CLAY SYNC ™ product (low molecular weight non-ionic polyacrylamide) | 2.0 ppb |
| GEM ™ product (long chain alcohol) | 2% |
| Poly Anionic Cellulose | 2 ppb |
| FILTER CHEK ™ product | 2.0 ppb |
| BARAZAN ® product | 1.0 ppb |
| Potassium Hydroxide | 0.5 ppb |
| BARITE ® product | As needed for desired density |

Figure 1:
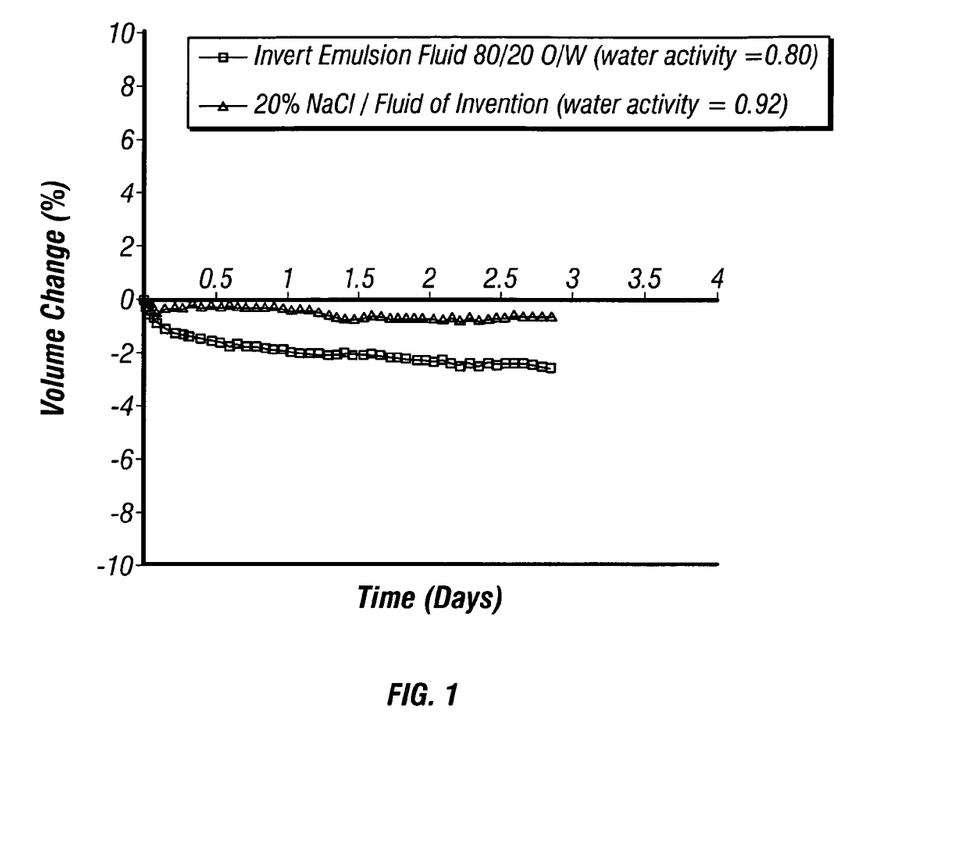
FIG. 1 is a graph comparing swellmeter data for an example aqueous-based drilling fluid of the invention with swellmeter data for an industry standard invert emulsion fluid.

As used herein, ppb means pounds per barrel. All trademarked products are available from Halliburton Energy Services, Inc. in Houston, Texas and Duncan, Oklahoma The tests indicated that the fluid of the invention is useful for hydrate suppression in deepwater offshore drilling and also is useful in producing gauge holes in young or "active" formations. See, for example, the swellmeter data for this example formulation of a fluid of the invention compared with swellmeter data for an industry standard invert emulsion fluid, graphed in FIG. 1.

Figure 2:
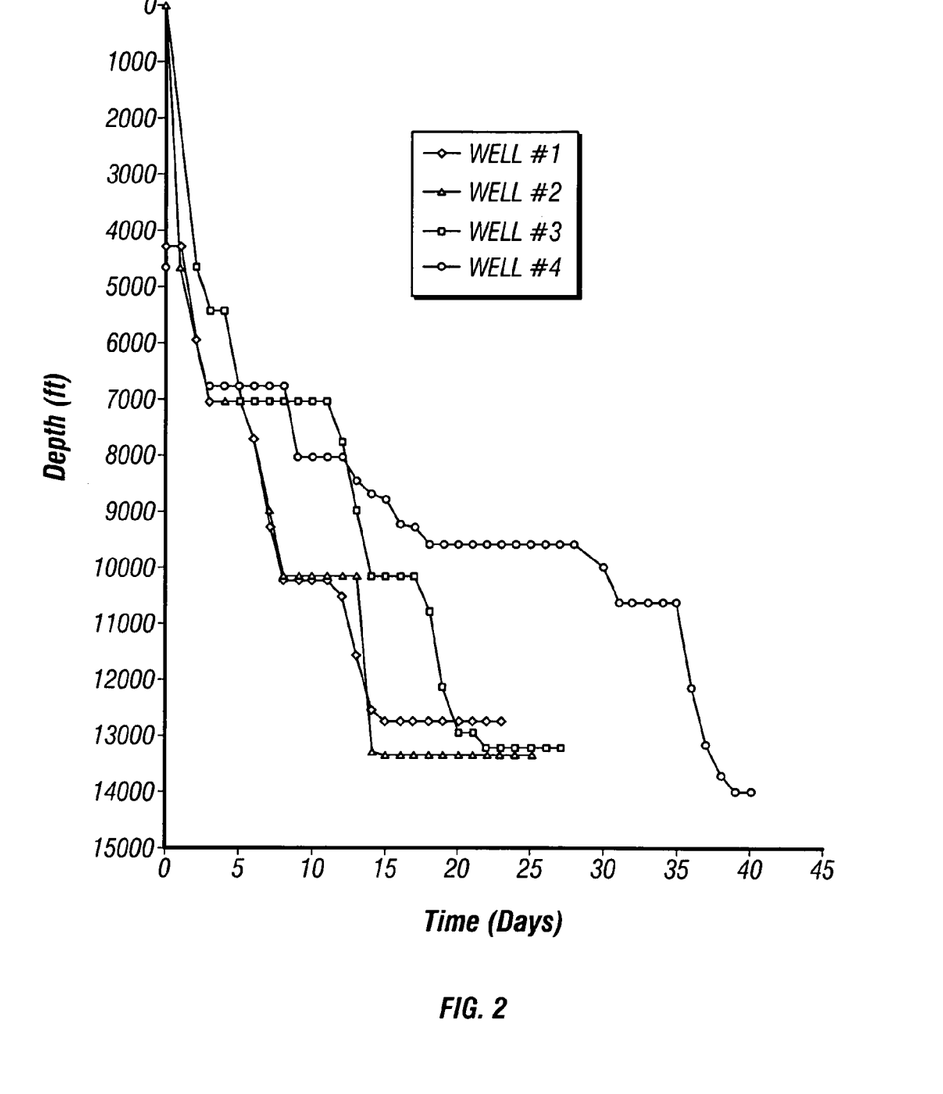
FIG. 2 is a graph showing the drilling rates of four different test wells, three using the fluid of the invention and one using an invert emulsion fluid.
Figure 3:
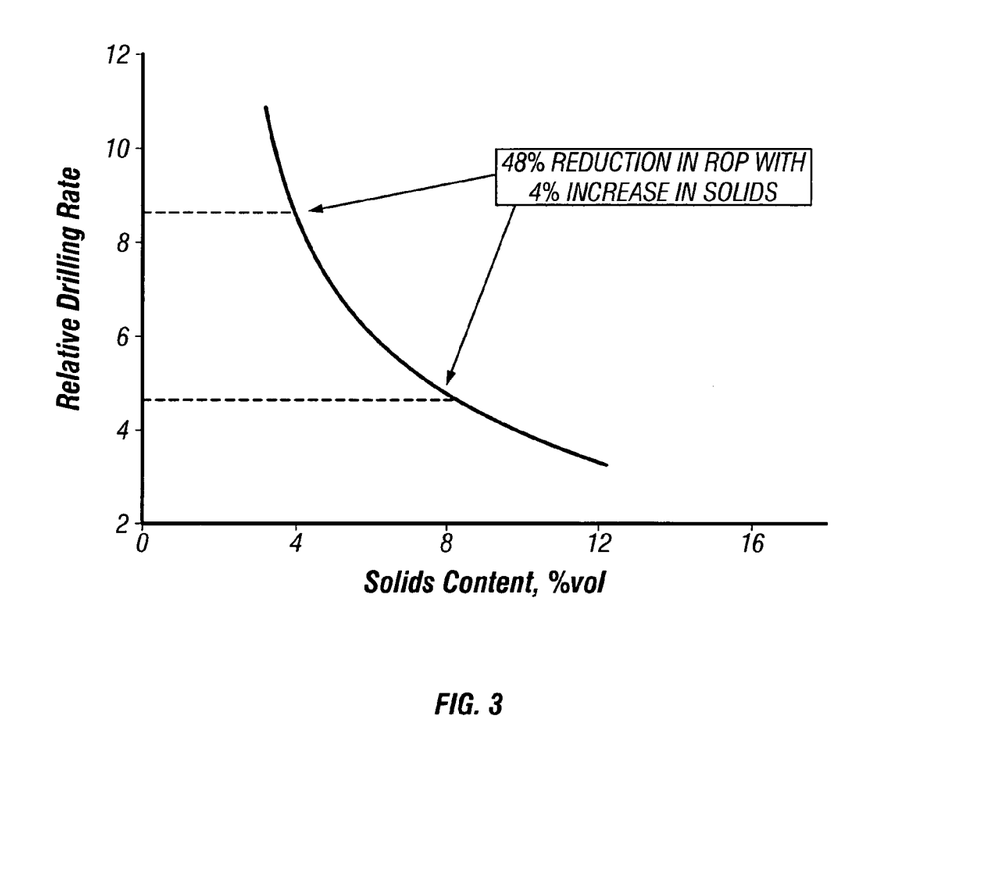
FIG. 3 is a graph showing the effect of solids in a drilling fluid on the penetration rate into a subterranean formation during drilling with an aqueous based drilling fluid without the benefit of the present invention.

The fluid is resistant to contaminants such as drill solids, cement, and acidic gases, and affords ease in mixing or preparation. The fluid is generally stable in temperatures ranging from about 30° F. to about 325° F. and provides good rheological properties, even in large deviated wellbores, without showing significant "sag" problems. The rate of penetration (ROP's) afforded with the fluid of the invention approaches those commonly seen with invert emulsion (oil-based) fluids. See, for example, FIG. 2 which shows the rates of penetration for three different test wells using example fluids of the present invention and one well using a commercially available invert emulsion fluid. FIG. 3 shows the effect of solids in a drilling fluid on the penetration rate into a subterranean formation during drilling with an aqueous based drilling fluid without the benefit of the present invention.

Without wishing to be limited by theory, it is believed that the mechanism that enables the drilling fluid of the present invention to achieve such favorable ROP's approximating those of invert oil emulsion based fluids is the ability of the fluid of the present invention to effect flocculation of the solids without adverse effects on the rheological properties of the fluid. The flocculation process allows for high surface area solids to be readily removed from the fluid. Such solids removal prevents interference of the solids with the properties of the drilling fluid and further prevents alteration of the drilling fluid by the solids.

Figure 4:
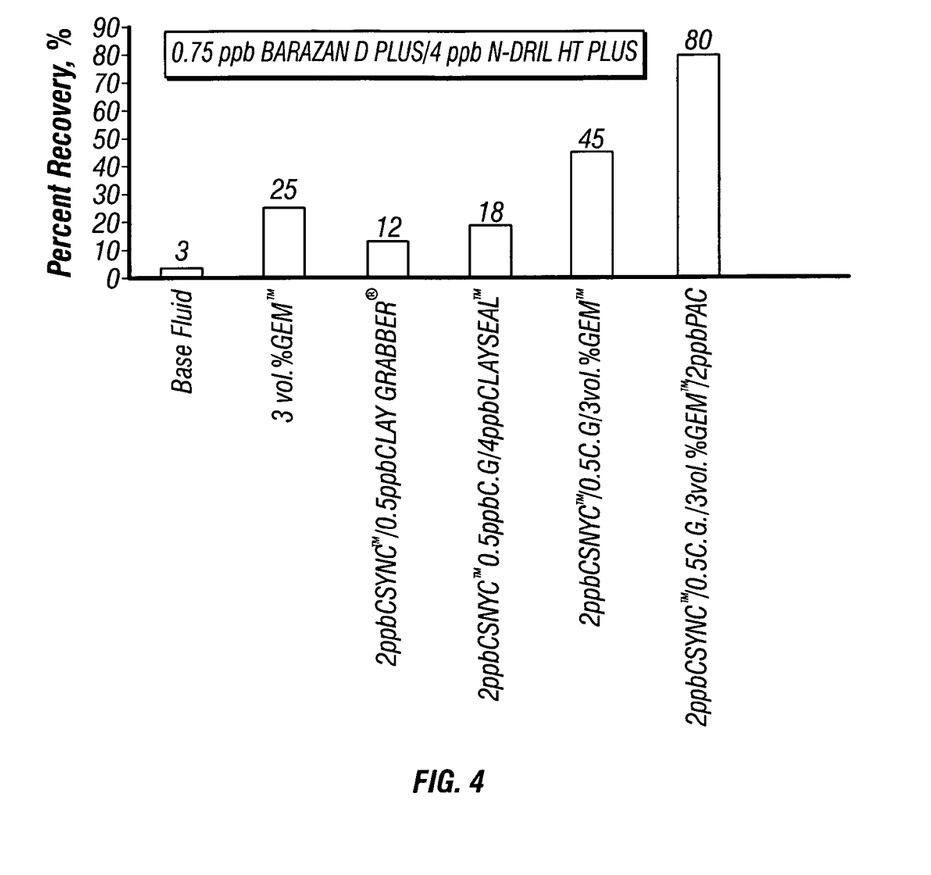
FIG. 4 is a graph comparing the shale recovery in Slake Durability Tests using certain various components of the fluid of the invention without others and in the synergistic combination of the invention.
Figure 5:
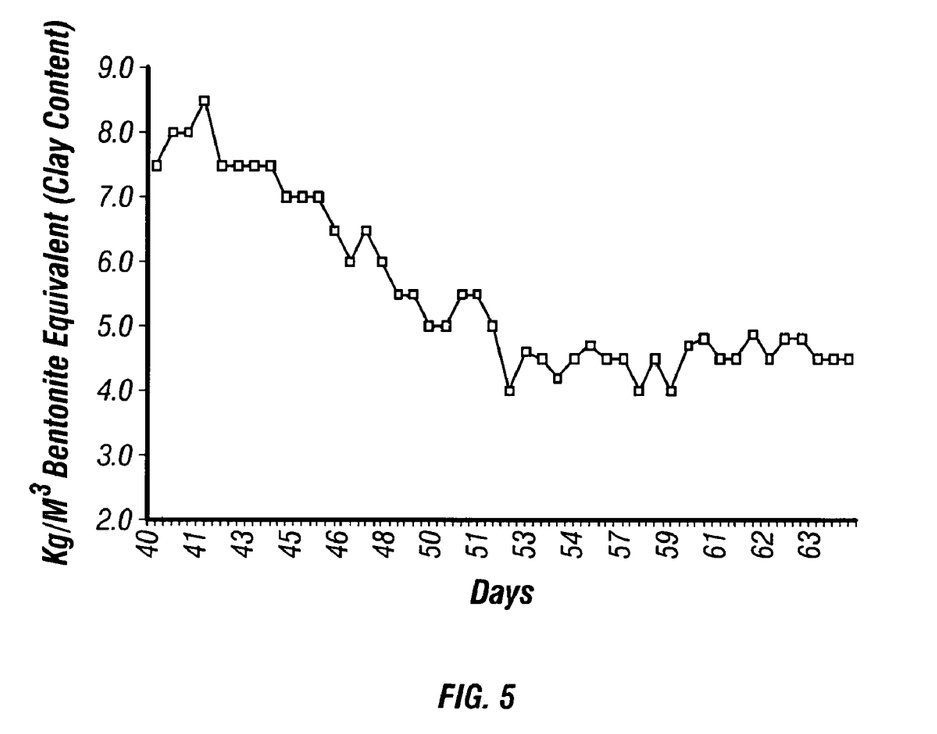
FIG. 5 is a graph showing the clay content in a fluid of the invention during an MBT test.

FIG. 4 compares the percent recovery of shales/drill cuttings using an aqueous fluid without the synergistic combination of the four additives of the present invention with aqueous fluids having one or more but not all of the additives, and then finally with an aqueous fluid containing all four additives, in a Slake Durability Test with London clay at ambient temperature with 11.0 ppg seawater muds. The tremendous benefit of the synergistic combination of high and low molecular weight polyacrylamides with long chain alcohol(s) and poly anionic cellulose in the aqueous fluid according to the present invention is clear, with an 80% recovery shown. That is, 80% of the shale remained "intact" or did not dissolve/disintegrate into the fluid when hot rolled in the fluid for an extended period of time. FIG. 5 is a graph showing the clay content in a fluid of the invention during an MBT test (Methylene Blue Test according to the API Standard Procedure for Testing Drilling Fluids). The minimal amount of clay in the fluid in this test is a strong indicator of the control and the ability of the fluid to inhibit the system as needed. Stability was maintained even after the temperature increased to 300° F. after day 53.

Figure 6:
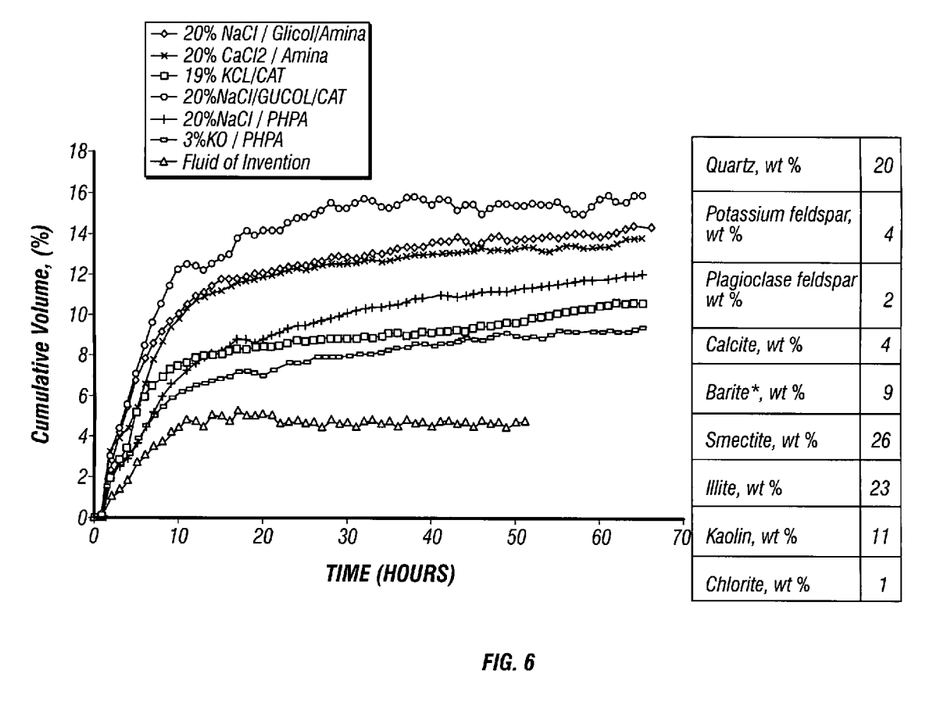
FIG. 6 is a graph comparing the effect (or lack of effect) of a fluid of the invention on reactive clays with the effect of prior art water based drilling fluids on reactive clays.
Figure 7:
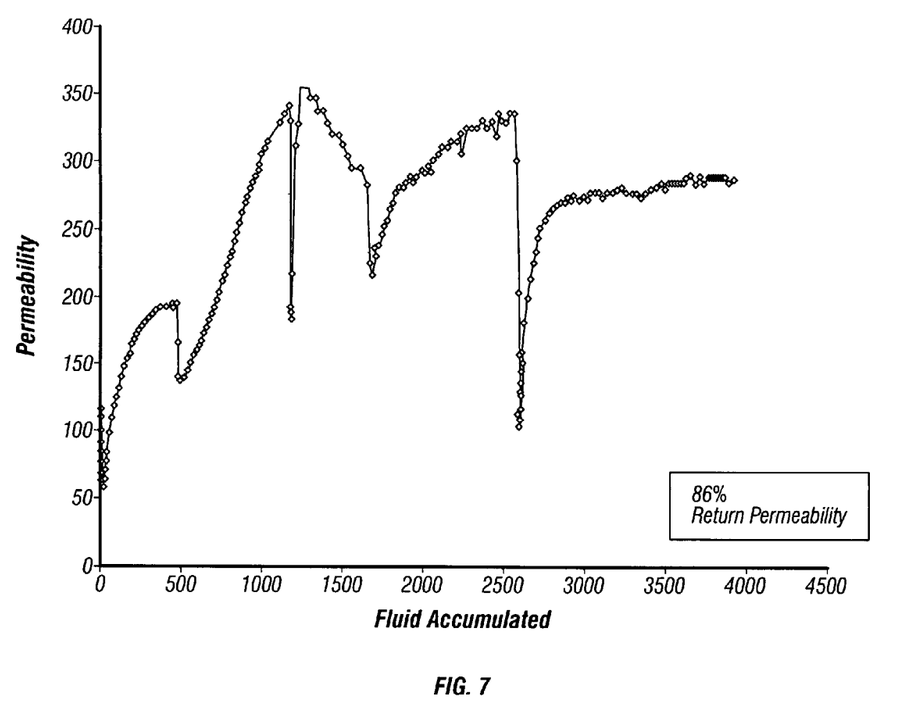
FIG. 7 is a graph of the results of a regain permeability test using a drilling fluid of the present invention in a well drilled through a hydrocarbon producing zone of a subterranean formation.

FIG. 6 is a graph comparing the effect (or lack of effect) of a fluid of the invention on reactive clays with the effect of prior art water based drilling fluids on reactive clays. The superiority of the fluid of the present invention to prior art aqueous based fluids is shown. FIG. 7 is a graph of the results of a "regain permeability test" using a drilling fluid of the present invention in a well drilled through a hydrocarbon producing zone of a subterranean formation. The test shows a regain permeability of 86%, further showing the ability of the fluid to avoid incorporation of undesirable solids.

Figure 8:
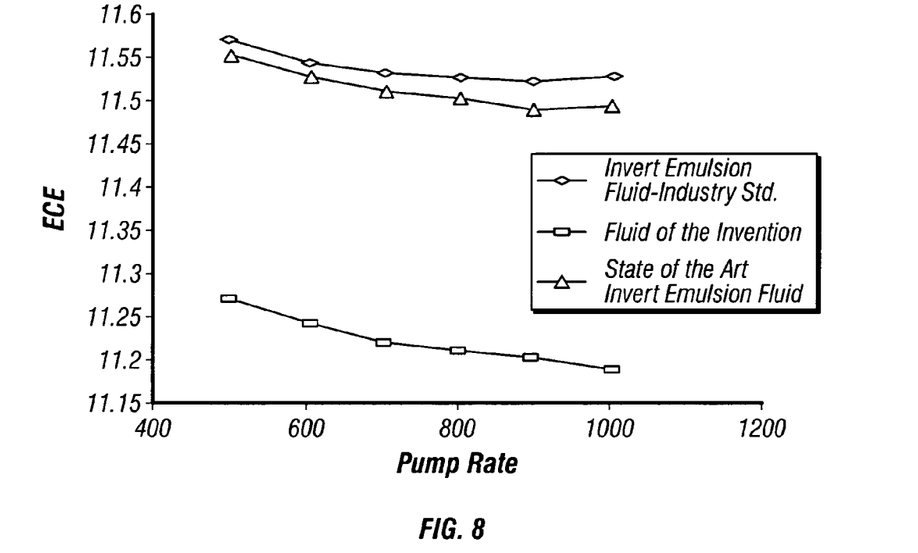
FIG. 8 is a graph comparing the ECDs of an example aqueous-based drilling fluid of the invention with the ECDs of an industry standard invert emulsion fluid and with a newer, advanced, "state-of-the-art" invert emulsion fluid.

The fluid of the invention also provides superior ECD's when compared to ECD's seen with invert emulsion fluids, which are more compressible than fluids of the invention. See, for example, the graph in FIG. 8 comparing the ECDs of the example formulation of a fluid of the invention set forth in Table II with an industry standard invert emulsion fluid and with a new and advanced "state-of-the-art" invert emulsion fluid. The difference in a drilling fluid's measured surface density and the drilling fluid's equivalent circulating density downhole (as typically measured during drilling by downhole pressure-while-drilling (PWD) equipment) is often called "ECD" in the industry. Low "ECDs", that is, a minimal difference in surface and downhole equivalent circulating densities, is critical in drilling deep water wells and other wells where the differences in subterranean formation pore pressures and fracture gradients are small.

Figure 9:
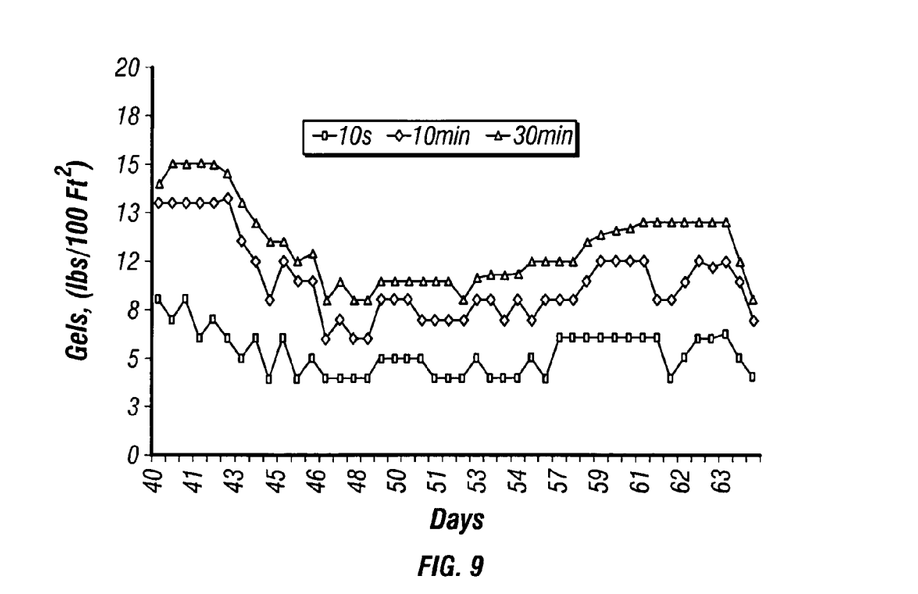
FIG. 9 is a graph showing gel strengths of a fluid of the invention over time.
Figure 10:
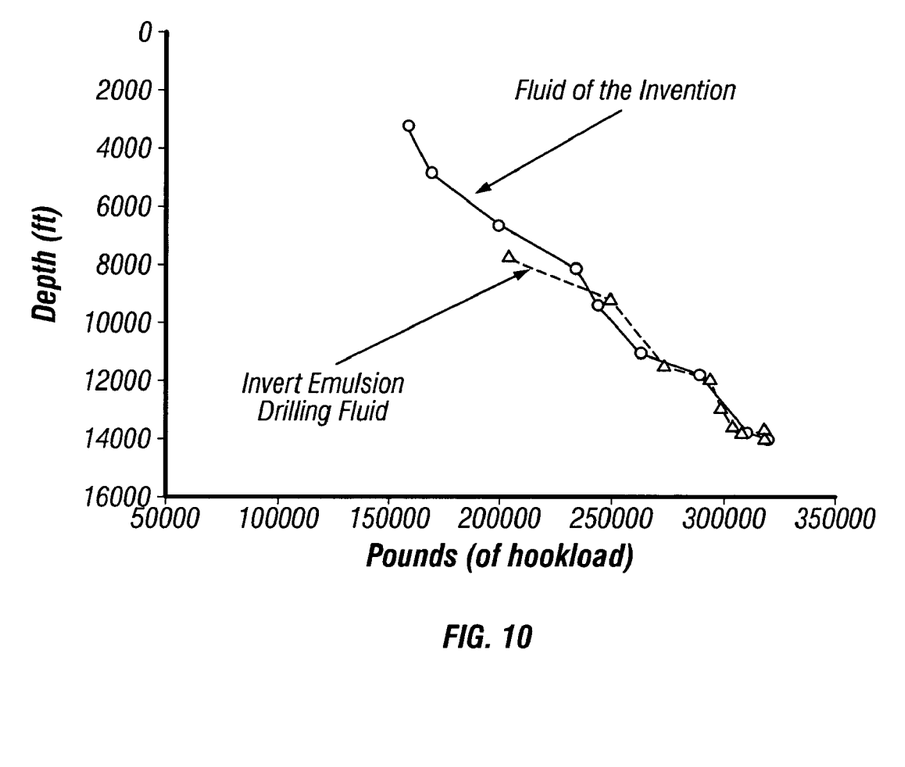
FIG. 10 is a graph comparing the drag while tripping in a well bore using a fluid of the invention with the drag using an industry standard oil based drilling fluid.

FIG. 9 is a graph showing gel strengths of a fluid of the invention over time. The behavior depicted indicates stable rheological properties, even after the temperature increased to 300° F. after day 53. FIG. 10 is a graph comparing the drag while tripping in a well bore using a fluid of the invention with the drag using an industry standard oil based drilling fluid. This graph indicates the fluid of the invention has good lubricity. While there are currently a number of lubricants commercially available for lending lubricity to aqueous based fluids, addition of such lubricants is not necessary with the fluid of the present invention which already provides the necessary amount of lubricity.

Table III below compares the rheological properties of the example formulation of a fluid of the invention set forth in Table II with the rheological properties of an industry standard invert emulsion fluid.

TABLE III

| | Temperature, °F. | | | | | | | |
|---|---|---|---|---|---|---|---|---|
| | 40 | 40 | 60 | 80 | 100 | 120 | 120 | 140 |
| | Pressure, phi | | | | | | | |
| | 0 | 2900 | 3500 | 4500 | 5500 | 0 | 6500 | 7500 |
| | FANN 75 Dial Readings | | | | | | | |
| A. FANN 75 RHEOLOGICAL PROPERTIES 11.0 LB/GAL WATER-BASED MUD | | | | | | | | |
| 600 rpm | 72 | 75 | 67 | 57 | 50 | 43 | 44 | 40 |
| 300 rpm | 47 | 51 | 45 | 39 | 34 | 28 | 28 | 26 |
| 200 rpm | 37 | 40 | 35 | 30 | 27 | 23 | 23 | 22 |
| 100 rpm | 26 | 27 | 23 | 21 | 19 | 18 | 15 | 14 |
| 6 rpm | 7 | 7 | 8 | 6 | 6 | 6 | 5 | 3 |
| 3 rpm | 7 | 6 | 6 | 6 | 5 | 5 | 4 | 3 |
| Plastic Viscosity, cP | 25 | 24 | 22 | 18 | 16 | 15 | 16 | 14 |
| Yield Point, lb/100 ft$^2$ | 22 | 27 | 23 | 21 | 18 | 13 | 12 | 12 |
| n | 0.643 | 0.597 | 0.656 | 0.607 | 0.609 | 0.642 | 0.693 | 0.647 |
| K | 0.826 | 1.205 | 0.690 | 0.843 | 0.713 | 0.469 | 0.348 | 0.441 |
| Tau 0, lb/100 ft$^2$ | 3.53 | 2.45 | 4.53 | 2.68 | 3.19 | 4.14 | 3.26 | 2.53 |
| B. FANN 75 RHEOLOGICAL PROPERTIES 11.0 LB/GAL PETROFREE ® SF, 80/20/SWR, 250,000 WPS | | | | | | | | |
| 600 rpm | 150 | 188 | 135 | 95 | 89 | 52 | 80 | 75 |
| 300 rpm | 93 | 115 | 82 | 62 | 60 | 35 | 56 | 55 |
| 200 rpm | 73 | 88 | 63 | 51 | 50 | 30 | 46 | 46 |
| 100 rpm | 51 | 59 | 43 | 37 | 36 | 24 | 35 | 35 |
| 6 rpm | 20 | 21 | 16 | 15 | 15 | 12 | 16 | 16 |
| 3 rpm | 19 | 21 | 15 | 15 | 15 | 1 | 16 | 16 |
| Plastic Viscosity, cP | 57 | 73 | 53 | 33 | 29 | 17 | 24 | 20 |
| Yield Point, lb/100 ft$^2$ | 36 | 42 | 29 | 29 | 31 | 18 | 32 | 35 |
| n | 0.785 | 0.795 | 0.814 | 0.697 | 0.651 | 0.699 | 0.629 | 0.546 |
| K | 0.606 | 0.731 | 0.454 | 0.690 | 0.886 | 0.337 | 0.900 | 0.512 |
| Tau 0, lb/100 ft$^2$ | 16.6 | 16.5 | 13.4 | 11.92 | 11.28 | 10.7 | 12.39 | 10.8 |

All trademarked products are available from Halliburton Energy Services, Inc. in Houston, Texas.

In a field test using the formulation set forth in Table II above, 86% return permeability was seen. The formation comprised about 31 wt % to about 38 wt % smectite and about 19 wt % to about 33 wt % illite. The average rate of penetration was about 100 to about 120 feet per hour with a peak rate of about 180 to about 200 feet to hour.

Table IV provides two alternative example formulations of fluids of the invention comprising a high molecular weight non-ionic polyacrylamide, or a high molecular weight substantially non-ionic polyacrylamide, and a low molecular weight non-ionic polyacrylamide, with an amine-based shale inhibitor CLAYSEAL™ product, available from Halliburton Energy Services, Inc. in Houston, Tex., but without a long chain alcohol. Table V provides Theological fluid properties for the fluids formulated as set forth in Table IV. Table VI provides rheological fluid properties for the fluids formulated as set forth in Table IV with addition of 45 ppb Rev Dust contamination. This data demonstrates that these alternative example formulations of the present invention also provide advantages of the present invention.

TABLE IV

| | Example Formulations | |
|---|---|---|
| | H1 | H4 |
| 20% NaCl | 0.863 | 0.863 |
| NaOH, lb | 0.25 | 0.25 |

TABLE IV-continued

| | Example Formulations | |
|---|---|---|
| | H1 | H4 |
| BARAZAN ™ D+ product, lb | 0.75 | 0.75 |
| FILTERCHEK ™ product, lb | 4 | 4 |
| CLAY SYNC ™, product, lb | 3.25 | 3.25 |
| (low molecular weight non-ionic polyacrylamide) | | |
| CLAY GRABBER ™ product, lb | 1.25 | |
| (high molecular weight non-ionic polyacrylamide) | | |
| BDF-467 ™ product, lb | | 1.25 |
| (high molecular weight substantially (≧95%) non-ionic polyacrylamide) | | |
| CLAYSEAL ™ product, lb | 4 | 4 |
| (amine based shale inhibitor) | | |
| BARITE ® product, lb | 201.2 | 201.2 |

As used herein, lb means pounds. All trademarked products are available from Halliburton Energy Services, Inc. in Houston, Texas and Duncan, Oklahoma

TABLE V

Fluid Properties

| | SAMPLE | |
|---|---|---|
| FANN 75 Dial Readings | H1 | H4 |
| 600 rpm | 87 | 84 |
| 300 rpm | 59 | 57 |
| 200 rpm | 46 | 46 |
| 100 rpm | 30 | 30 |
| 6 rpm | 7 | 6 |
| 3 rpm | 5 | 4 |
| 10 s/10 min Gel Strength | 6.5/7.5 | 6.0/6.0 |
| Plastic Viscosity, cP | 28 | 27 |
| Yield Point, lb/100 ft$^2$ | 31 | 30 |
| API, ml | 1.2 | <0.5 |

TABLE VI

Fluid Properties, after 45 ppb Rev Dust contamination

| | SAMPLE | |
|---|---|---|
| FANN 75 Dial Readings | H1 | H4 |
| 600 rpm | 105 | 114 |
| 300 rpm | 71 | 74 |
| 200 rpm | 54 | 57 |
| 100 rpm | 35 | 37 |
| 6 rpm | 7 | 8 |
| 3 rpm | 5 | 5 |
| 10 s/10 min Gel Strength | 6.0/7.0 | 7.0/8.0 |
| Plastic Viscosity, cP | 34 | 40 |
| Yield Point, lb/100 ft$^2$ | 37 | 34 |

Advantages of the invention may be obtained by employing a drilling fluid (or drilling fluid system) of the invention in drilling operations, particularly drilling operations in swelling or sloughing shales, salt, gypsum, anhydrite or other evaporate formations, hydrogen sulfide-containing formations, and/or hot (greater than about 300° F.) holes. The drilling operations—whether drilling a vertical or directional or horizontal borehole, conducting a sweep, or running casing and cementing—may be conducted as known to those skilled in the art with other drilling fluids. That is, a drilling fluid of the invention is prepared or obtained and circulated through a wellbore as the wellbore is being drilled (or swept or cemented and cased) to facilitate the drilling operation. The drilling fluid removes drill cuttings from the wellbore, cools and lubricates the drill bit, aids in support of the drill pipe and drill bit, and provides a hydrostatic head to maintain the integrity of the wellbore walls and prevent well blowouts. The specific formulation of the drilling fluid in accordance with the present invention is optimized for the particular drilling operation and for the particular subterranean formation characteristics and conditions. For example, the fluid is weighted as appropriate for the formation pressures and thinned as appropriate for the formation temperatures. The sizes/molecular weights of the high molecular weight substantially non-ionic polyacrylamide, the low molecular weight substantially non-ionic polyacrylamide, the long chain alcohol (or polyol), and the poly anionic cellulose, may be adjusted for the pore size of the formation so that the fluid can better form an effective membrane against hydration of the water-sensitive zones as well as accomplish flocculation of drill solids and the usual functions of a drilling fluid such as sweep and transport of drill cuttings.

The foregoing description of the invention is intended to be a description of preferred embodiments. Various changes in the details of the described fluids and methods of use can be made without departing from the intended scope of this invention as defined by the appended claims.

What is claimed is:

1. A method for drilling in a water-sensitive subterranean formation, comprising:
    providing an aqueous-based drilling fluid comprising:
        a high molecular weight, about 95-100% non-ionic, polyacrylamide having a molecular weight in the range of about 4 million to about 15 million, and
        a low molecular weight, about 95-100% non-ionic, polyacrylamide having a molecular weight in the range of about 500,000 to about 2 million,
        wherein the high molecular weight polyacrylamide and the low molecular weight polyacrylamide are selected from the group of polyacrylamides consisting of homopolymers, copolymers, terpolymers and combinations thereof,
        wherein the high molecular weight polyacrylamide and the low molecular weight polyacrylamide each have a purity of at least about 95% acrylamido monomer species, and
        wherein the drilling fluid retards hydration of the water-sensitive formation; and
    drilling in the subterranean formation with the drilling fluid.

2. The method of claim 1 wherein a ratio of low molecular weight polyacrylamide to high molecular weight polyacrylamide is maintained in the drilling fluid in a ratio of about 16:6 to about 1:1.

3. The method of claim 1 wherein the drilling fluid is free of any other polyacrylamide.

4. The method of claim 1 wherein the drilling fluid is free of any clay-based additive.

5. The method of claim 1 wherein the drilling fluid further comprises a shale inhibitor selected from the group consisting of one or more long chain alcohols having a molecular weight in the range of about 100 to about 900, an amine, or a sodium or potassium silicate.

6. The method of claim 5 wherein the drilling fluid further comprises poly anionic cellulose.

7. The method of claim 1 wherein the high molecular weight polyacrylamide has a molecular weight in the range of about 4 million to about 8 million.

8. The method of claim 1 wherein the aqueous-base comprises about 0 weight percent to about 25 weight percent organic or inorganic monovalent salt.

9. The method of claim 1 wherein the aqueous-base comprises sea water.

10. The method of claim 1 wherein the pH of the drilling fluid is maintained at about 8.5 to about 10.0.

11. The method of claim 1 wherein the drilling comprises drilling a wellbore.

12. The method of claim 1 wherein the drilling comprises drilling through at least one producing zone in the formation.

13. The method of claim 1 wherein the drilling comprises completing a wellbore.

14. The method of claim 1 wherein the drilling comprises running casing and cementing a wellbore.

15. The method of claim 1 wherein the drilling comprises stabilizing the wellbore.

16. An aqueous-based drilling fluid for use in drilling a wellbore in a water-sensitive subterranean formation, comprising:

a high molecular weight, about 95-100% non-ionic, polyacrylamide having a molecular weight in the range of about 4 million to about 15 million;

a low molecular weight, about 95-100% non-ionic, polyacrylamide having a molecular weight in the range of about 500,000 to about 2 million; and one or more long chain alcohols having a molecular weight in the range of about 100 to about 900, poly anionic cellulose, or both;

wherein the high molecular weight polyacrylamide and the low molecular weight polyacrylamide are selected from the group of polyacrylamides consisting of homopolymers, copolymers, terpolymers and combinations thereof;

wherein the long chain alcohols are selected from the group consisting of polyethoxylated alcohols, polypropoxylated alcohols, and a combination thereof; and wherein the drilling fluid retards hydration of the water-sensitive formation while drilling, without the presence of clay based additives.

17. An aqueous-based drilling fluid for use in drilling a wellbore in a water-sensitive subterranean formation, comprising:

a high molecular weight, about 95-100% non-ionic, polyacrylamide having a molecular weight in the range of about 4 million to about 15 million;

a low molecular weight, about 95-100% non-ionic, polyacrylamide having a molecular weight in the range of about 500,000 to about 2 million; and an amine or silicate shale inhibitor;

wherein the high molecular weight polyacrylamide and the low molecular weight polyacrylamide are selected from the group of polyacrylamides consisting of homopolymers, copolymers, terpolymers and combinations thereof; and wherein the drilling fluid retards hydration of the water-sensitive formation while drilling, without the presence of clay based additives.

18. The drilling fluid of claim 16 wherein the aqueous-base comprises about 0 weight percent to about 25 weight percent organic or inorganic monovalent salts.

19. The drilling fluid of claim 16 wherein the pH is maintained at about 8.5 to about 10.0.

20. The drilling fluid of claim 16 wherein the low-molecular weight non-ionic polyacrylamide comprises about 1 to about 2 weight percent of the fluid, the long chain alcohols and poly anionic cellulose comprise about 1 to about 2 weight percent of the fluid, and the high-molecular weight non-ionic polyacrylamide comprises about 0.5 weight percent of the fluid.

21. A method for enhancing the flocculation of an aqueous based drilling fluid, comprising adding to the fluid:

a high molecular weight, about 95-100% non-ionic, polyacrylamide having a molecular weight in the range of about 4 million to about 15 million, and a low molecular weight, about 95-100% non-ionic, polyacrylamide having a molecular weight in the range of about 500,000 to about 2 million, wherein the high molecular weight polyacrylamide and the low molecular weight polyacrylamide are selected from the group of polyacrylamides consisting of homopolymers, copolymers, terpolymers and combinations thereof, and wherein the high molecular weight polyacrylamide and the low molecular weight polyacrylamide each have a purity of at least about 95% acrylamido monomer species.

22. The method of claim 21 wherein the drilling fluid is free of clay-based additives.

23. The method of claim 21 further comprising adding to the drilling fluid:

one or more long chain alcohols having a molecular weight in the range of about 100 to about 900 and/or poly anionic cellulose, wherein the low-molecular weight polyacrylamide comprises about 1 to about 2 weight percent of the drilling fluid, the long chain alcohols and/or poly anionic cellulose comprise about 1 to about 2 weight percent of the drilling fluid, and the high-molecular weight polyacrylamide comprises about 0.5 weight percent of the fluid.

24. The method of claim 21 further comprising adding to the drilling fluid an amine or silicate shale inhibitor.

* * * * *